Figure 1:
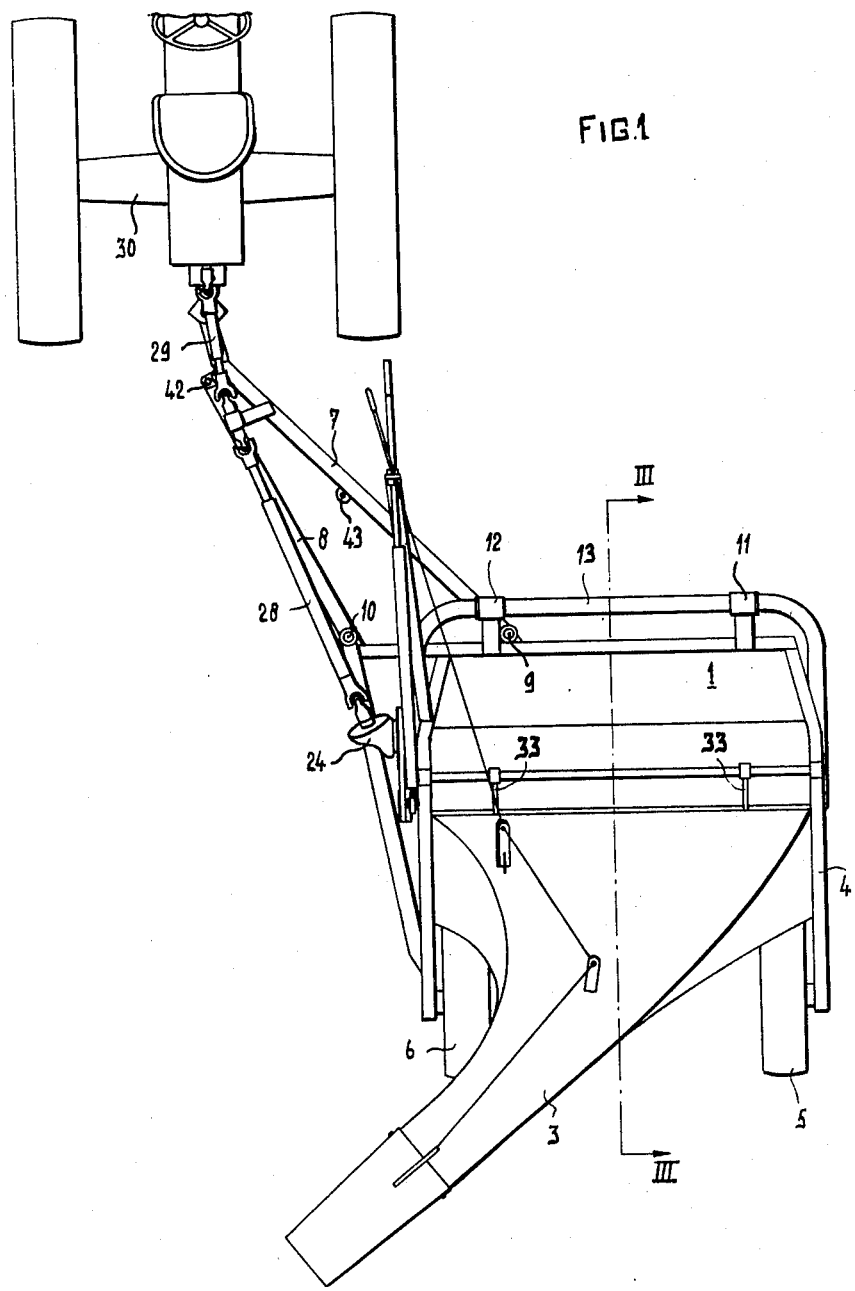

Oct. 12, 1965     C. VAN DER LELY     3,210,918
FORAGE HARVESTERS
Original Filed June 18, 1959     3 Sheets-Sheet 1

INVENTOR.
CORNELIS VAN DER LELY
BY
Mason, Mason & Albright
Attorneys

Oct. 12, 1965 C. VAN DER LELY 3,210,918
FORAGE HARVESTERS
Original Filed June 18, 1959 3 Sheets-Sheet 2
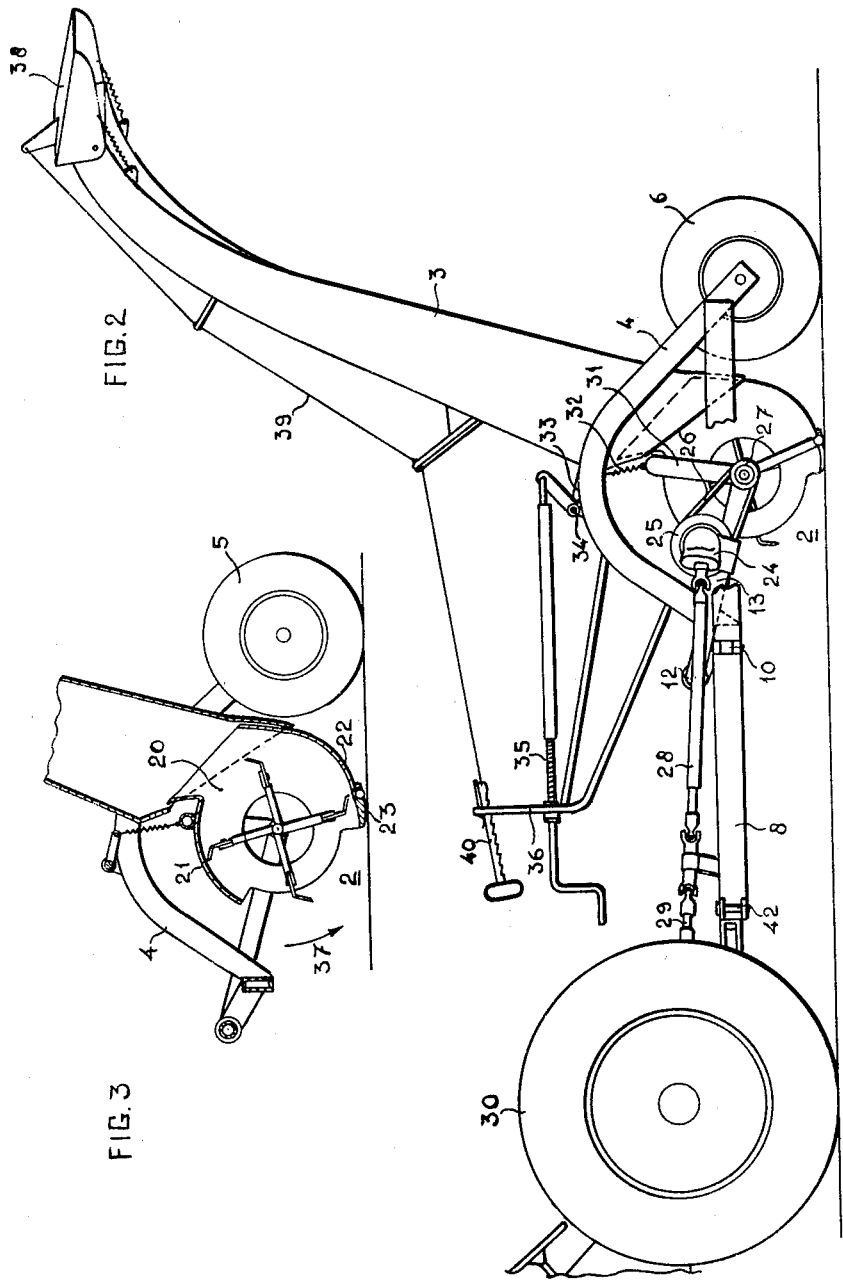
INVENTOR.
CORNELIS VAN DER LELY
BY
Mason, Mason & Albright
Attorneys

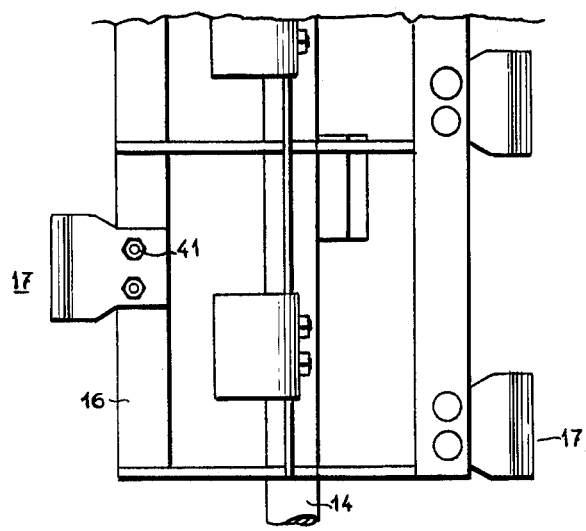
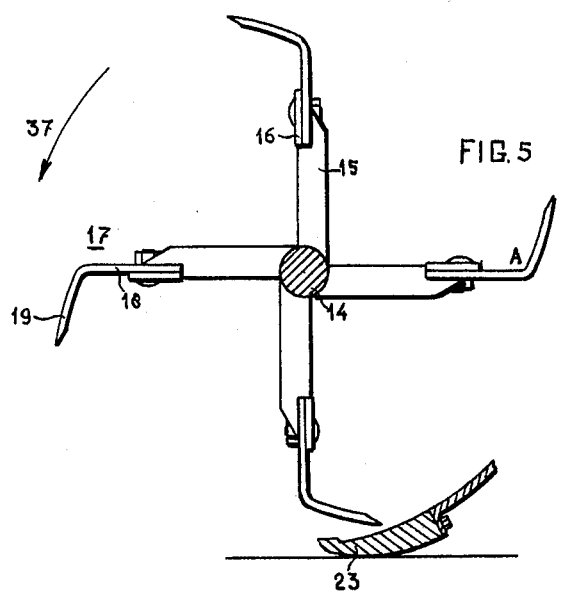

3,210,918
FORAGE HARVESTERS
Cornelis van der Lely, Zug, Switzerland, assignor to Patent Concern N.V., Willemstad, Netherland Antilles, a limited liability company of the Netherlands Antilles
Original application June 18, 1959, Ser. No. 821,154, now Patent No. 3,070,940, dated Jan. 1, 1963. Divided and this application Nov. 14, 1962, Ser. No. 237,595
5 Claims. (Cl. 56—24)

This is a division of application Serial No. 821,154, filed June 18, 1959, now Patent No. 3,070,940.

This invention relates to forage harvesters.

In accordance with the present invention there is provided a forage harvester comprising a frame carrying a crop cutter mechanism and an upstanding delivery pipe for the delivery of cut crop, said cutting mechanism comprising a rotary cutter cylinder and a ledger blade located below the cutter cylinder and adapted to co-operate with the knives of the cutter cylinder at or near their lowest positions during their rotation, the cutting mechanism being disposed beneath the delivery pipe so that the crop may be thrown uninterruptedly and directly into the delivery pipe.

For a better understanding of the invention and to show how the same may be carried into effect, reference will now be made, by way of example, to the accompanying drawings in which:

FIGURE 1 is a plan view of an embodiment of a forage harvester according to the invention, FIGURE 2 is a side elevation corresponding to FIGURE 1, FIGURE 3 is a sectional view taken on the line III—III of FIGURE 1, FIGURE 4 is an enlarged plan view of a detail of the implement shown in FIGURE 1, FIGURE 5 is a sectional side elevation corresponding to FIGURE 4. The embodiment shown in FIGURES 1 to 5 comprise a frame 1 carrying a cutting mechanism 2 disposed at the lower end of an upstanding delivery pipe 3 for elevating the cut crop.

The frame 1 includes a generally U-shaped frame beam 4, which has two ground wheels 5 and 6 mounted at the rear. The frame beam 4 has drawbars 7 and 8 pivotally connected at 9 and 10 to the front thereof. The forward ends of the draw-bars 7 and 8 are coupled by a pin 42. The draw-bar 7 has a bracket 43 secured thereto about mid-way along its length. The end of the bar 8 may be alternatively coupled to the bracket 43, the draught point then being displaced laterally with respect to the implement. The frame 4 carries bearings 11 and 12, in which one limb of a second, generally U-shaped beam 13 is journalled. The ends of the beam 13 support the cutting mechanism 2, which includes a cutter cylinder consisting of a shaft 14 (see FIGURES 4 and 5) carrying radially extending arms 15, the extremities of which are connected by bars 16 extending parallel to the shaft 14. The bars 16 have knives 17 attached thereto, each knife having a radial portion 18 and a substantially tangential portion 19, the angle A (see FIGURE 5) between the radial end the tangential portions being between 90° and 120° (in FIGURE 5 the angle is about 95°). The knives are rigidly secured to the bars 16 by means of bolts 41, but since the bolts can be released, the knives can be readily replaced when desired. The cutter cylinder is arranged in a housing 20 (see FIGURE 3) which includes a plate 21 for screening the top of the cylinder and a plate 22 for screening the rear thereof, there being a delivery mouth 20A between these plates. The lower edge of the plate 22 carries a cutter bar 23 which bears on the ground. The cutter cylinder is driven from a gearbox 24 by means of a pulley 25, a V-belt 26 and a pulley 27 fixed on the shaft 14. The gear-box 24 is driven from a shaft 28, which extends to the front end of the draw-bar 7, where it is adapted to be coupled to the power take-off shaft 29 of a tractor 30.

Since the beam 14 can move about a pivotal axis by virtue of the provisions of the bearings 11 and 12, such axis being in front of the cutting mechanism 2, the latter is capable of moving up and down in response to unevenness in the ground. In order that the cutter bar 23 should not bear upon the ground under the action of the full weight of the cutting mechanism and its supports, an U-shaped beam 31 is arranged to overlie the plate 21, with the parallel limbs of such beam extending downwardly to locations where they effectively support the ends of the shaft of the cutter cylinder (see FIGURES 2 and 3). The beam 31 thus takes the form of a stirrup and has draw-springs 32 which are connected to arms 33 fixed on a shaft 34 which is turnably mounted on the frame beam 4. By appropriately positioning the arms 33, the springs 32 can take at least part of the weight of the cutting mechanism 2 and housing 20. In order to increase or decrease the pressure of the cutter bar 23 on the ground, the tension in the springs 32 can be increased or decreased by turning the shaft 34 and hence the arms 33, with the aid of a screw-jack mechanism 35, supported at one end in a bracket 36 fixed to the frame beam 4, and connected at the other end to an arm 36A also fixed to the shaft 34 (see FIGURE 2). When the arms 33 are turned through a large angle in an appropriate direction, the harvester can be easily transported since the cutting mechanism can be raised well clear from the ground.

When the harvester is in use, the cutter cylinder of the cutting mechanism 2 rotates rapidly in the direction indicated by the arrow 37 in FIGURES 3 and 5, the crop being cut by the knives 19. The cutter bar 23, past which the knives 19 move, constitutes a relatively, stationary knife, and the crop can be mown near to the ground. The cutter bar preferably has a sharp edge which is located slightly above the ground. Owing to the rapid rotation of the cutting cylinder the crop is thrown up into the delivery pipe 3, this action being assisted by the rush of air up the delivery pipe resulting from the rotation of the bars 16 and the knives 17. The knives 17 are arranged in the cutter cylinder in such a way, that they partly overlap each other, as seen in direction perpendicular to the axis of rotation, as is evident from FIGURE 4. The knives 17 are distributed substantially helically along the curved surface of the cutter cylinder, which ensures a satisfactory mowing action.

At its top end the delivery pipe 3 has a flap 38, which can be adjusted by means of a pull-wire 39 and a spring-loaded rack bar 40 entered in a slot formed in the bracket 36. The flap 38 is urged, by springs 38A, downwardly and can be raised by pulling the rack bar 40 forwardly. In this way the direction in which the crop is delivered can be varied.

The delivery pipe 3 is of a cross-section which decreases in area from bottom to top, as seen in FIGS. 1 and 2. The plane of the rectangle at the lower end of the pipe 3 is substantially horizontal, and that at the top is substantially vertical, the latter plane being turned away from the line of travel of the implement through an angle of about 45°. The flow lines afforded by the delivery pipe 3 thus formed allow uninterrupted transport of crop. The lower end of the delivery pipe 3 which is secured to the frame 4, is so shaped, that the delivery mouth 20A of the housing 20 is capable of moving in the lower part of the pipe 3.

What we claim is:

1. A forage harvester comprising a frame carrying a crop cutter mechanism and an upstanding delivery pipe for the delivery of cut crop, said cutting mechanism comprising a rotary cutter cylinder and a ledger blade located below the cutter cylinder, said cutting cylinder rotating in a rearwardly direction with respect to the direction of travel, the edge of the ledger blade cooperating with the cutter cylinder being disposed directly beneath the axis of rotation of the cutter cylinder, the cutter mechanism being disposed beneath the delivery pipe, guide means provided for the uninterrupted rearward delivery of the crop into the delivery pipe, the said guide means being located behind the cutter cylinder with respect to the direction of travel of the harvester.

2. The structure of claim 1, wherein the ledger-blade bears upon the ground under the action of at least part of the weight of the cutter mechanism.

3. The structure of claim 1, wherein the cutter cylinder has fixed knives which are distributed substantially helically along the curved surface of the cutter cylinder.

4. The structure of claim 3, wherein each of said knives has a substantially radial portion and a substantially tangential portion, the angle between such portions being about 90° to 120°.

5. The structure of claim 3, wherein said cutter cylinder includes bars which lie substantially parallel to the rotational axis of the cutter cylinder, said knives being detachably secured to said bars.

References Cited by the Examiner
UNITED STATES PATENTS

| | | | |
|---|---|---|---|
| 2,674,081 | 4/54 | Hansen | 56—24 X |
| 3,035,393 | 5/62 | Mathews | 56—24 X |

ANTONIO F. GUIDA, *Primary Examiner.*

T. GRAHAM CRAVER, *Examiner.*